United States Patent
Goldenberg et al.

[11] Patent Number: 6,142,187
[45] Date of Patent: Nov. 7, 2000

[54] DEVICE FOR REPAIRING PIPES

[75] Inventors: Andrew A. Goldenberg, Toronto; Pawel Kuzan; Jacek Wiercienski, both of Oakville, all of Canada

[73] Assignees: The Consumers' Gas Company Ltd., Toronto, Canada; Consolidated Edison Company of New York, Inc., New York, N.Y.

[21] Appl. No.: 09/172,998

[22] Filed: Oct. 15, 1998

[30] Foreign Application Priority Data

Oct. 15, 1997 [CA] Canada ................................. 2218436

[51] Int. Cl.[7] .................................................. F16L 55/18
[52] U.S. Cl. ................................................ 138/97; 138/98
[58] Field of Search .............................. 138/97, 98

[56] References Cited

U.S. PATENT DOCUMENTS

| | | | |
|---|---|---|---|
| 2,977,994 | 4/1961 | Xenis .................................... | 138/97 |
| 3,315,017 | 4/1967 | Kemp .................................... | 264/36 |
| 3,606,913 | 9/1971 | Yie ........................................ | 138/97 |
| 3,718,978 | 3/1973 | Van Koevering et al. .............. | 138/97 |
| 3,753,766 | 8/1973 | Brown et al. .......................... | 138/97 |
| 4,178,875 | 12/1979 | Moschetti ............................. | 138/97 |
| 4,245,970 | 1/1981 | St. Onge ............................... | 138/97 |
| 4,421,698 | 12/1983 | Vanderlans ............................ | 264/40.1 |
| 4,442,891 | 4/1984 | Wood .................................... | 166/55.2 |
| 4,504,204 | 3/1985 | Koga ..................................... | 425/11 |
| 4,582,551 | 4/1986 | Parkes et al. .......................... | 156/94 |
| 4,646,787 | 3/1987 | Rush et al. ............................ | 138/98 |
| 4,724,108 | 2/1988 | Jurgenlohmann et al. ............ | 138/97 |
| 4,741,795 | 5/1988 | Grace et al. ........................... | 138/98 |
| 4,986,314 | 1/1991 | Himmler ............................... | 138/97 |
| 5,044,824 | 9/1991 | Long et al. ............................ | 405/156 |
| 5,223,272 | 6/1993 | Pringle ................................. | 425/13 |
| 5,253,956 | 10/1993 | Fisco et al. ........................... | 138/97 |
| 5,259,880 | 11/1993 | Fujita et al. .......................... | 425/13 |
| 5,527,169 | 6/1996 | Goldenberg et al. ................. | 425/11 |
| 5,878,783 | 3/1999 | Smart .................................... | 138/93 |

*Primary Examiner*—James Hook
*Attorney, Agent, or Firm*—Dimock Stratton Clarizio; Mark B. Eisen

[57] ABSTRACT

A device for repairing a pipe internally includes a body and a drill assembly mounted on the body. The drill assembly has upper and lower arms, pivotable between a closed position in which the arms occupy a radial area not substantially greater than a diameter of the body and an open position in which the arms bear against substantially opposing points of the pipe wall to stabilize the drill assembly within the pipe. In the preferred embodiment for repairing pipe joints a hydraulic drill head bears against the pipe wall when the arms are in the open position and drills a hole for a sealant nozzle mechanism mounted on the upper arm, which swings into position in front of the drill head to inject a sealant into the pipe joint through the drill hole and seal the joint.

40 Claims, 14 Drawing Sheets

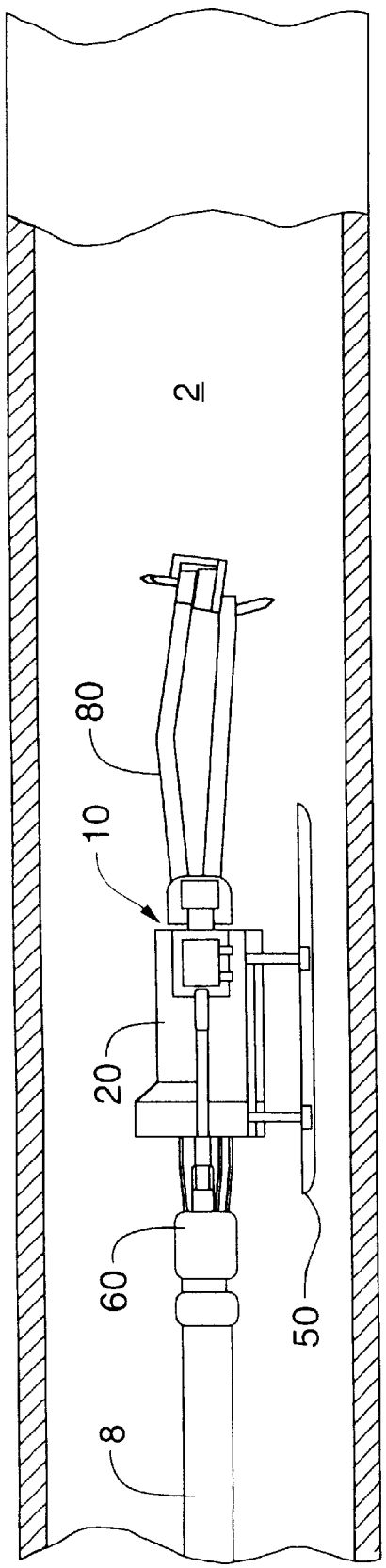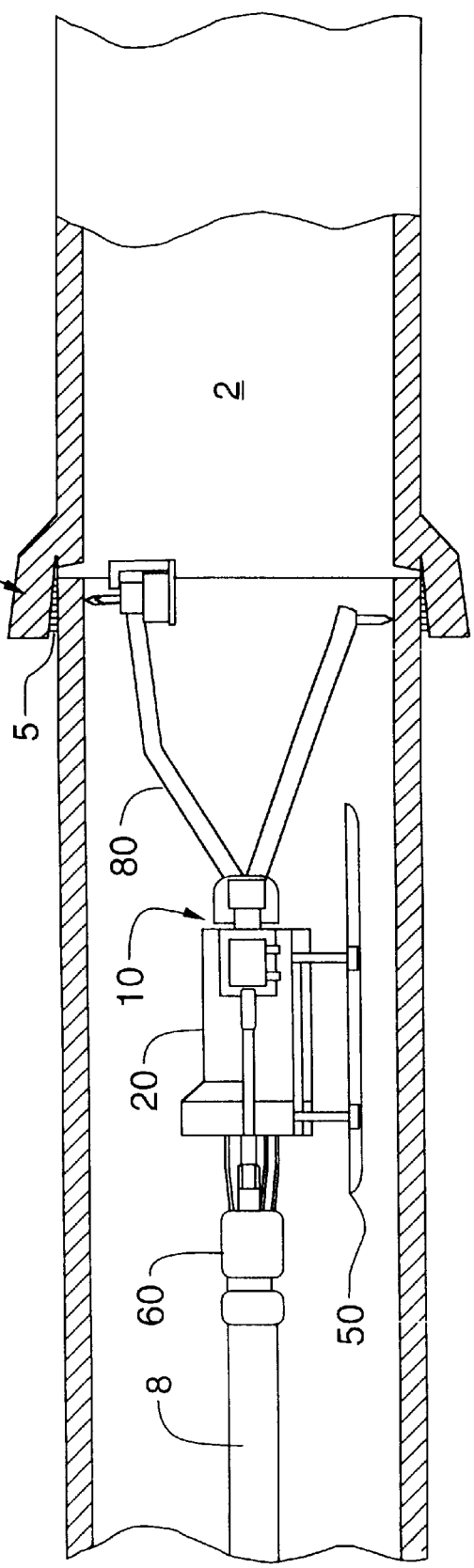

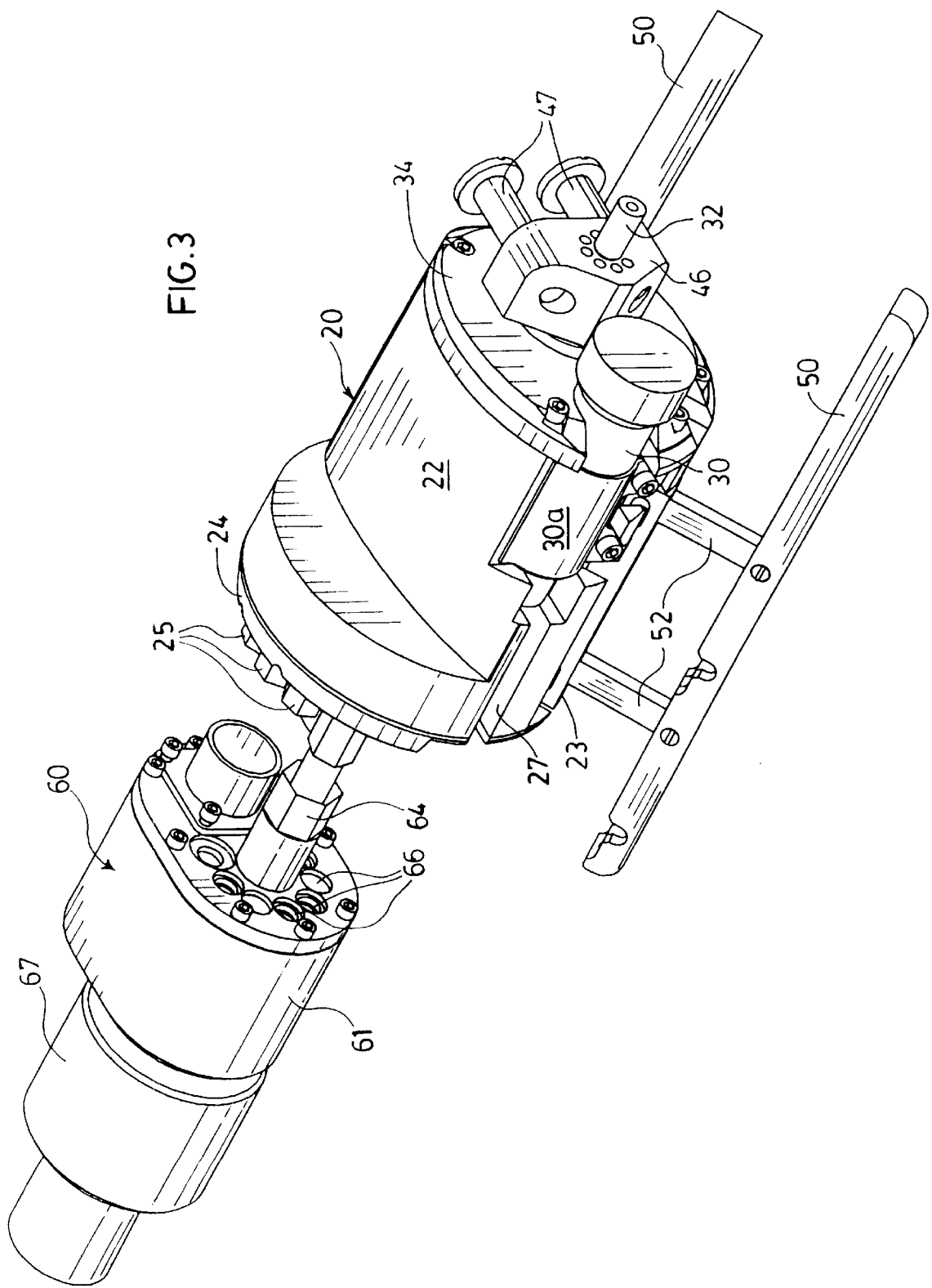

DEVICE FOR REPAIRING PIPES

FIELD OF INVENTION

This invention relates to an apparatus for repairing pipes. In particular, this invention relates to a portable device for insertion into a cast iron pipe or the like for facilitating the location and repair of damaged or worn areas, particularly pipe joints, from within the pipe.

BACKGROUND OF THE INVENTION

Underground pipelines are commonly used as fluid conduits for conveying fuels such as natural gas to residential, commercial and industrial users. Many existing pipelines are composed of sections of cast iron pipe connected by spigot joints, in which an end or "spigot" of one pipe section is interference-fitted into a "bell" or flared end of the next adjoining section, and the cavity between the bell and the spigot is filled with jute and lead for a gas-tight seal.

Over time some of the joints develop leaks due to ground settlement, vibration, yearly temperature cycles, corrosion etc., and must be repaired or replaced. Typically such pipelines are far too small for a person to enter, and as such repairs have conventionally required excavation of the pipeline. This is a costly and time-consuming process.

It is therefore advantageous to be able to effect repairs from inside the pipeline.

An apparatus capable of carrying out pipe repairs from inside a pipe is disclosed in U.S. Pat. No. 4,986,314 to Himmler, which is incorporated herein by reference. A working head provided with a tool holder is rotatably mounted on the front of a self-propelled trolley which can be inserted into a pipeline. A television camera allows the operator to locate damaged areas, and the tool holder can be fitted with the appropriate tool to effect repairs. The working head is rotatable circumferentially, to permit repairs on any part of the pipe wall. However, in this device the trolley is quite large and is provided with a locking device that enables the trolley to support and resist the force of the working head when grinding, cutting etc. inside a pipe, which requires a large cross-sectional body size that commensurately reduces the effective cross-sectional area of the pipeline when the device has been inserted. Accordingly, the device of U.S. Pat. No. 4,986,314 requires that the pipeline be shut down before repairs are undertaken. Moreover, this device will not fit through a typical opening in the pipeline, so the pipe must first be broken before the device can be introduced. These are significant disadvantages in the repair and maintenance of a fuel pipeline, particularly a natural gas pipeline.

The present invention provides a device for repairing pipes internally. The device of the invention is particularly useful for the sealing of spigot joints. The device comprises a body supporting a drill assembly having upper and lower stabilizing arms which, when opened within a pipe, bear against diametrically opposite points of the pipe wall to stabilize the device. The upper arm is provided with a drill head for drilling into the pipe and a sealant nozzle mechanism for injecting a sealant through the drill hole. Preferably the drill assembly is rotationally fixed to the body so that it can be rotated circumferentially within a selected arc to select the attitude of entry of the drill bit. A camera transmits images of the pipe interior to the operator, who can thus locate and repair successive pipe joints without the need for excavating.

The cross-sectional area occupied by the device of the present invention is relatively compact so as not to interfere with the flow of gas, which allows the device to be used within a "live" natural gas pipeline. The hydraulic drill assembly eliminates the need for a bulky, trolley-like structure for stability and to oppose the force of drilling. Mounting the drill head on an arm of the drill assembly provides significant control and precision in positioning the drill, which is important to ensure the effective dispersion of sealant within the pipe joint. These and other advantages will be apparent from the description of the invention which follows.

The present invention thus provides a device for repairing a pipe having a pipe wall, comprising a body and a drill assembly mounted on the body, the drill assembly comprising upper and lower arms, pivotable between a closed position in which the arms occupy a radial area not substantially greater than a diameter of the body and an open position in which the arms bear against substantially opposing points of the pipe wall to stabilize the drill assembly within the pipe, a locating system for locating a portion of the pipe to be repaired, and a rotating member for rotating a tool against the pipe wall when the arms are in the open position.

The present invention further provides a device for repairing a pipe joint, comprising a body and a drill assembly mounted on the body, the drill assembly comprising upper and lower arms pivotable between a closed position in which the arms occupy a radial area not substantially greater than a diameter of the body and an open position in which the arms bear against substantially opposing points of a wall of the pipe to stabilize the drill assembly within the pipe, a drill head for urging a drill against the pipe wall when the arms are in the open position to produce a drill hole, a locating system for locating a portion of the pipe to be repaired, a remotely operated control panel for controlling the device, and a sealant injection mechanism mounted on the upper arm for injecting a sealant into the pipe joint through the drill hole.

The invention further provides a method of repairing a pipe joint from inside a pipe, comprising the steps of inserting into the pipe a device comprising a body having a drill assembly including an actuator and a sealant nozzle mechanism, locating a pipe joint, activating the actuator to urge a drill bit against the pipe and drilling a hole through the pipe, retracting the drill bit from the hole, moving the sealant nozzle mechanism in front of the actuator and activating the actuator to cause the sealant nozzle mechanism to bear against the hole, and injecting sealant into the hole.

BRIEF DESCRIPTION OF THE DRAWINGS

In drawings which illustrate by way of example only a preferred embodiment of the invention, FIG. 1 is a schematic side elevation of a device embodying the invention within a pipe with the drill assembly in a closed position, FIG. 2 is a schematic side elevation of a device embodying the invention within a pipe with the drill assembly in an open position for drilling, FIG. 3 is a perspective view of the body and umbilical cable adaptor of the device of FIG. 1.

DETAILED DESCRIPTION OF THE INVENTION

Figure 4:
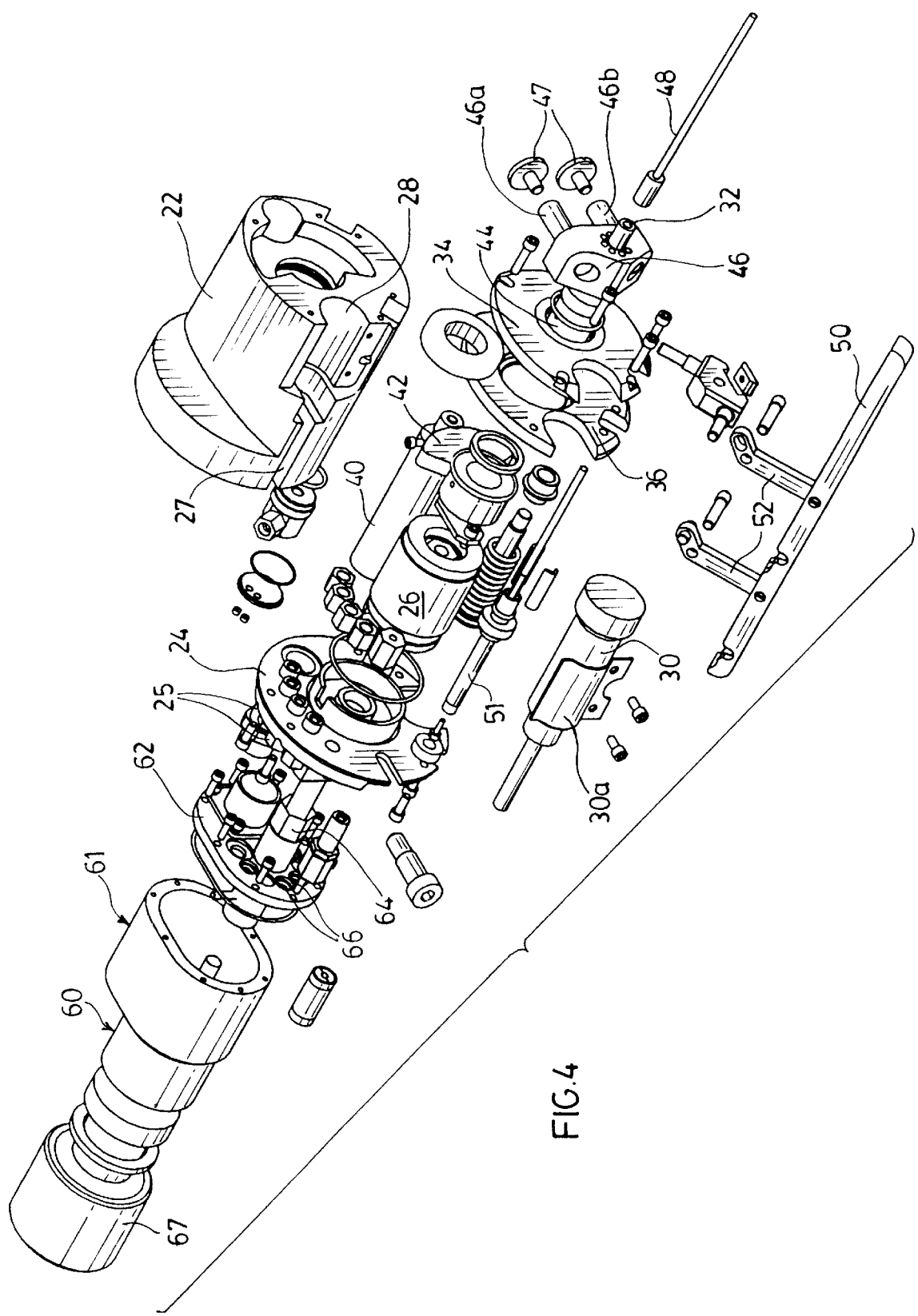
FIG. 4 is an exploded perspective view of the body and umbilical cable adaptor of FIG. 3.

A preferred embodiment of the device 10 of the invention is illustrated in FIGS. 1 and 2. The device 10 comprises a body 20 housing electrical devices used in the operation of the device 10, and a drill assembly 80. The device 10 is adapted to be inserted into a cast iron pipe 2 or the like, and to be fed along the pipe 2 until an area requiring repair is reached. In the preferred embodiment adapted for repairing spigot joints 4, the device 10 drills into the pipe wall creating an access into the jute 5 within the clearance between the spigot and the bell, and injects a sealant into the jute 5.

An umbilical cable adaptor 60 is provided to releasably couple the device 10 to an umbilical cable 8 supplying the hoses and electrical wires required to operate the device 10. A preferred embodiment of an umbilical cable 8 and a cable feeding mechanism which may be advantageously employed in the utilization of the device of the present invention is described and illustrated in U.S. Pat. No. 5,681,131 issued Oct. 28, 1997, which is incorporated herein by reference.

In the preferred embodiment of the device 10 of the invention the body 20 comprises a smooth stainless steel housing 22 with a back plate 24 forming a sealed enclosure containing a brushless drill motor 26. Front plates 34, 36 are bolted to the front end of the housing 22. The back plate 24 is provided with couplings 25 for the various hydraulic lines used by the device 10, a sealant hose, and a conduit containing electrical cables for the drill motor 26, gear motor 40 and lights 31, 33, which connect through the umbilical cable 8 attached to the cable adaptor 60 to an operator control station 9.

Figure 6:
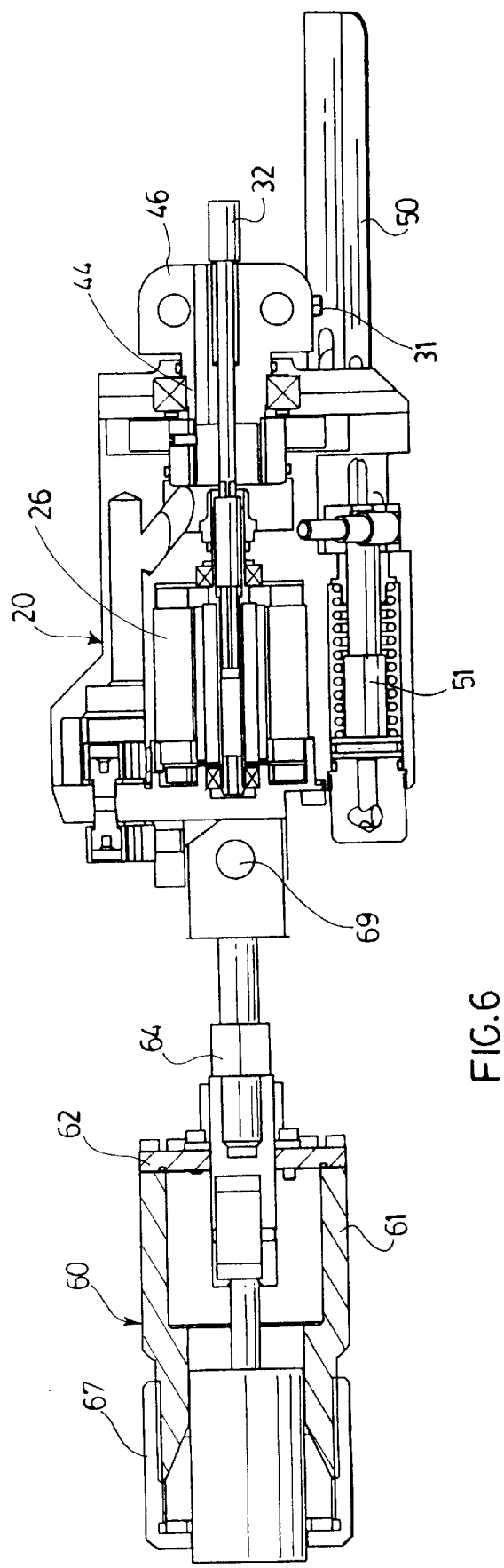
FIG. 6 is a cross-sectional side elevation of the body and umbilical cable adaptor of FIG. 3.

The cable adaptor 60 likewise includes an adaptor housing 61 having a front plate 62 with a main coupling 64 and suitable openings 66 for the conduits and wires that feed the hydraulic oil, sealant and electrical power to the body 20 from the umbilical cable 8, and a rear sleeve 67. The main coupling 64 connects to the back plate 24 of the body 20 at hinge 69, providing a limited-angle hinge action, as best seen in FIG. 6, for accommodating entry into the pipe 2. The device 10 is quickly and easily connected to and disconnected from the umbilical cable 8, which facilitates removal of a device 10 for maintenance and repair and allows the same umbilical cable 8 to be used for devices 10 of different sizes (for example, for repairing pipelines having different diameters).

The umbilical cable 8 is a semi-rigid conduit containing the hydraulic and sealant hoses and electrical wires necessary to operate the device 10. The umbilical cable 8 preferably comprises a protective nylon jacket containing a fibreglass rod surrounded by a PVC coating extending through the length of the cable 8, which imparts sufficient rigidity to the cable 8 to allow the device 10 to be fed down a pipe 2 without the cable 8 becoming entangled or bunching up within the pipe 2, as described and illustrated in U.S. Pat. No. 5,681,131.

A miniature DC motor 40 with integral high-ratio planetary gearhead is mounted adjacent to the drill motor 26 and coupled to a crescent gear 42 which rotates a hollow shank 44 supporting the drill assembly mount 46. The drill assembly mount 46 can thus be rotated about an axis of the device 10, from a neutral position in which the drill assembly 60 is oriented substantially vertically relative to the body 20 to a variable attitude in either direction of the neutral position, preferably in the range of approximately +/−45°. This allows the operator some flexibility in determining the point of entry into the pipe wall and facilitates drilling multiple drill holes if necessary for larger pipes 2. The drill assembly 80 attaches to pins 46a, 46b projecting from the side of the drill assembly mount 46 by bolts 47 and thus projects forwardly on one side of the housing 22, leaving an unobstructed path on the other side of the housing 22 for a locating system which assists the operator in locating a pipe joint or other portion of the pipe to be repaired.

In the preferred embodiment the locating system comprises a miniature video camera 30 which is mounted by clip 30a into a recess 28 on the other side of the housing 22. Preferably the video camera 30 is permanently attached to the umbilical cable 8, and is mounted to the body 20 when the device 10 is coupled to the cable 8 with the video cable concealed within a groove 27 in the housing 22.

Figure 7:
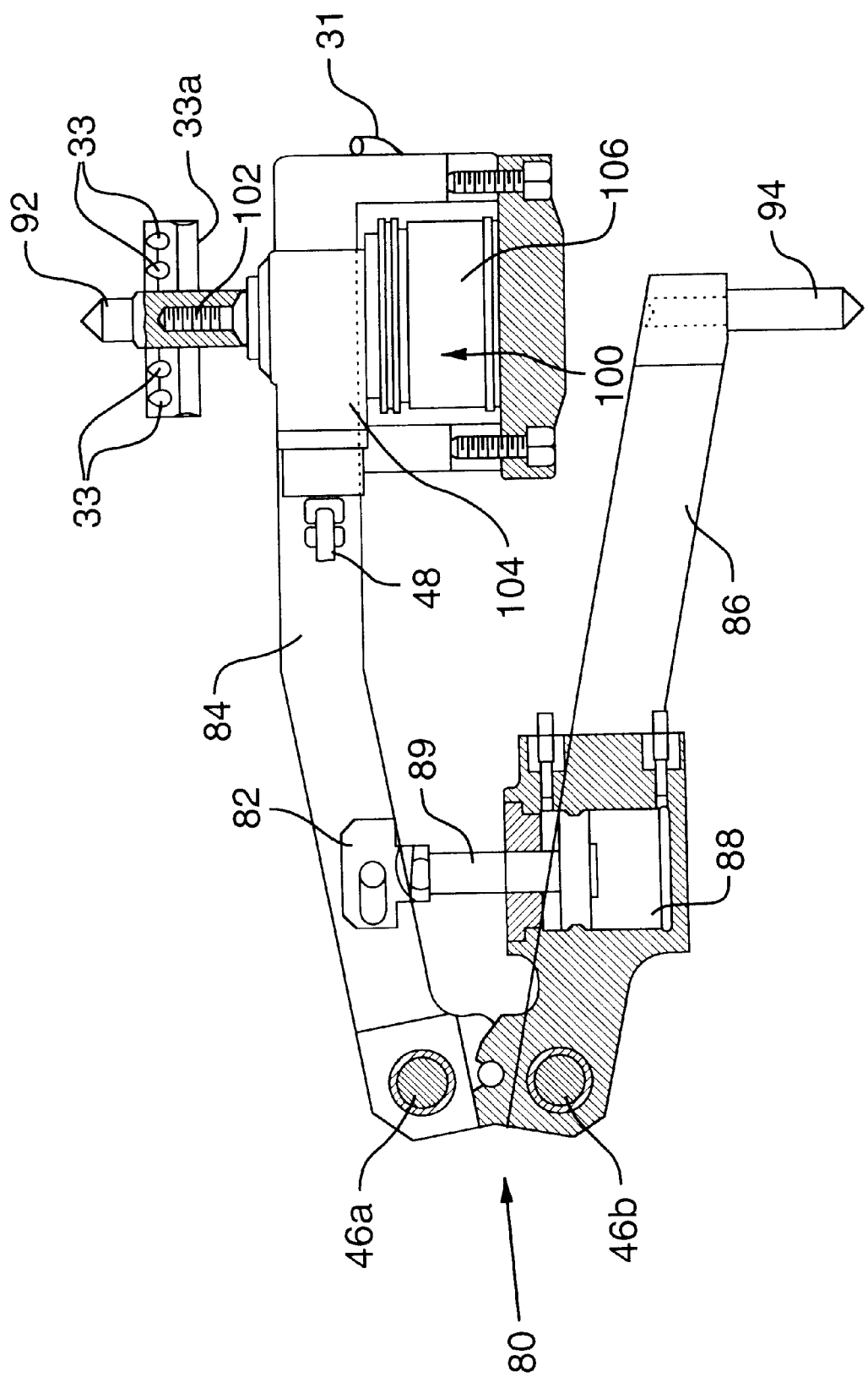
FIG. 7 is a side elevation of a preferred embodiment of the drill assembly for the device of FIG. 1.

Preferably the device 10 includes a set of lights 31 underneath the drill assembly mount 46 and at least one light pointer 33 positioned on the upper arm 84 of the drill assembly 80, as shown in FIG. 7. The lights 31 illuminate the inner wall of the pipe 2, the pipe joint 4 and front portions of the drill assembly 80 from the camera side of the housing 22, and the light pointers 33 are used by the operator to precisely locate the drill head 100 for drilling as described below, both preferably being operated independently by separate switches at the operator control station 9.

The light pointers 33 may be mounted in a mounting block 33a composed of a Teflon or another suitable material, are provided to assist the operator in locating a suitable position for drilling into a pipe joint 4. Because of imperfections, corrosion and accumulation of debris within the pipe 2, it is often difficult using the video locating system alone to discern the position of a pipe joint 4, even where the interior of the pipe 2 is well lit. The light pointers 33 each create a small focused light spot on the pipe wall, which is directed toward the camera side of the device 10 (i.e. across the vertical center of the drill assembly 80) so as to fall within the field of view of the camera 30, and preferably aimed so that the leading light spot disappears into the joint gap between the spigot and the bell just as the device 10 approaches the correct drilling position. Momentary disappearance of the leading light spot and its reappearance on the other side of the joint gap thus indicates to the operator that the device 10 is substantially in position for drilling.

A pair of light pointers 33 has been found to be more effective than a single light pointer 33, the extra light pointer 33 providing an additional reference point which allows the operator to exercise some judgment in selecting the optimal position for drilling, which may differ slightly from one pipeline to another. Thus, in the preferred embodiment two pairs of light pointers 33 are provided, one pair providing reference points for drilling when the device 10 approaches a pipe joint 4 from the spigot side of the joint 4, and the other pair providing reference points when the device 10 approaches the pipe joint 4 from the bell side of the joint 4.

The drill motor 26 rotates a shaft 32 which extends coaxially through the hollow shank 44 and out of the drill assembly mount 46 to rotate the rotating member, which in the preferred embodiment for repairing pipe joints comprises a drill head 100, through a flexible shaft 48 composed of a suitably strong material such as fibreglass or a semi-rigid polymer. The flexible shaft 48 may alternatively be formed from a steel spring or the like.

The body 20 preferably comprises a pair of retractable skis or runners 50 which support the body 20, preferably such that the axis of the shaft 32 is approximately aligned with the nominal axis of the pipe 2. The height at which the body 20 is supported thus varies according to the inside diameter of the pipe 2 intended to be repaired. The runners 50 should be rigid and suitably strong, and as smooth as possible to avoid friction against the pipe wall and resist becoming snagged in debris within the pipe 2. The runners 50 are preferably formed from stainless steel, but other materials may also be suitable. The runners 50 are preferably symmetrically spaced approximately 120° about the vertical center of the body 20.

Figure 5:
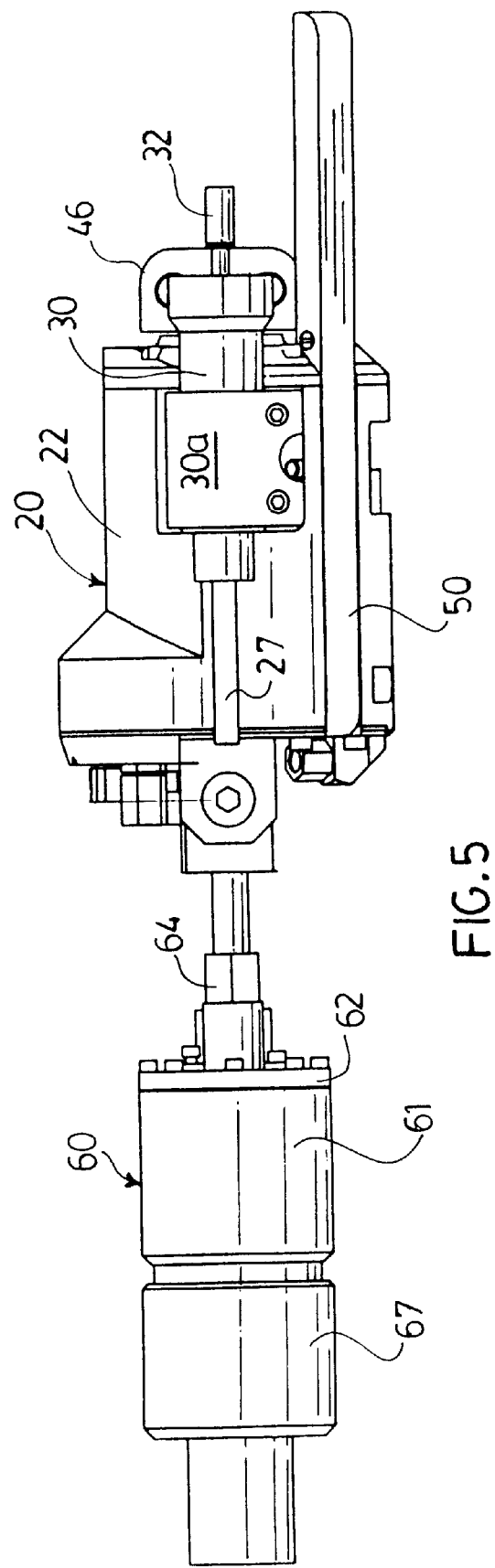
FIG. 5 is a side elevation of the body and umbilical cable adaptor of FIG. 3.

The runners 50 are fixed to the housing 22 by struts 52, the length of which is selected according to the desired height of the body 20 within the pipe 2, which are pivotally secured to the runners 50 at one end and pivotally secured to the housing 22 at the other end. This allows the runners 50 to retract forwardly into grooves 23 formed axially along the housing wall, as shown in FIG. 5. In the preferred embodiment the runners 50 are moved between the extended and retracted positions by a runner actuator comprising hydraulic cylinder 51 mounted inside the housing 22.

Figure 8:
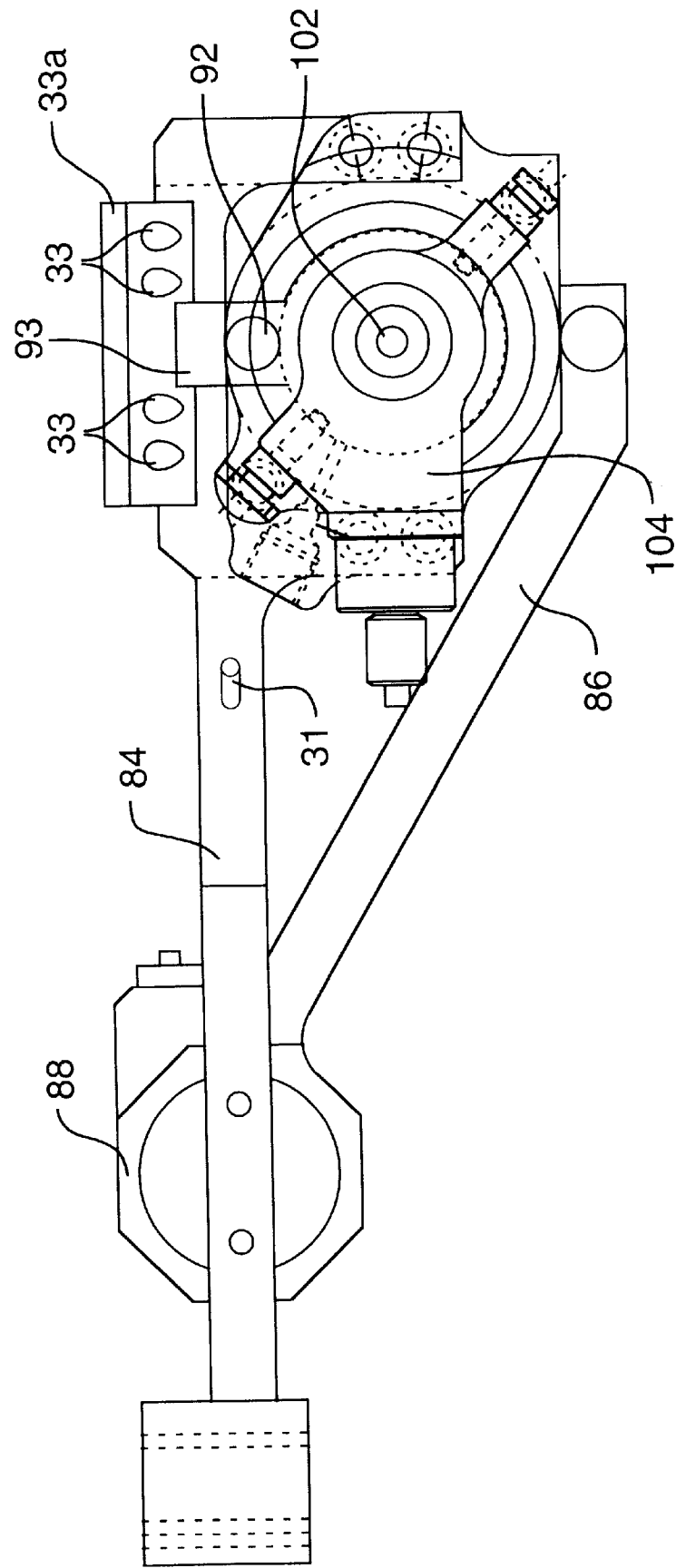
FIG. 8 is a top plan view of the drill assembly of FIG. 7.
Figure 9:
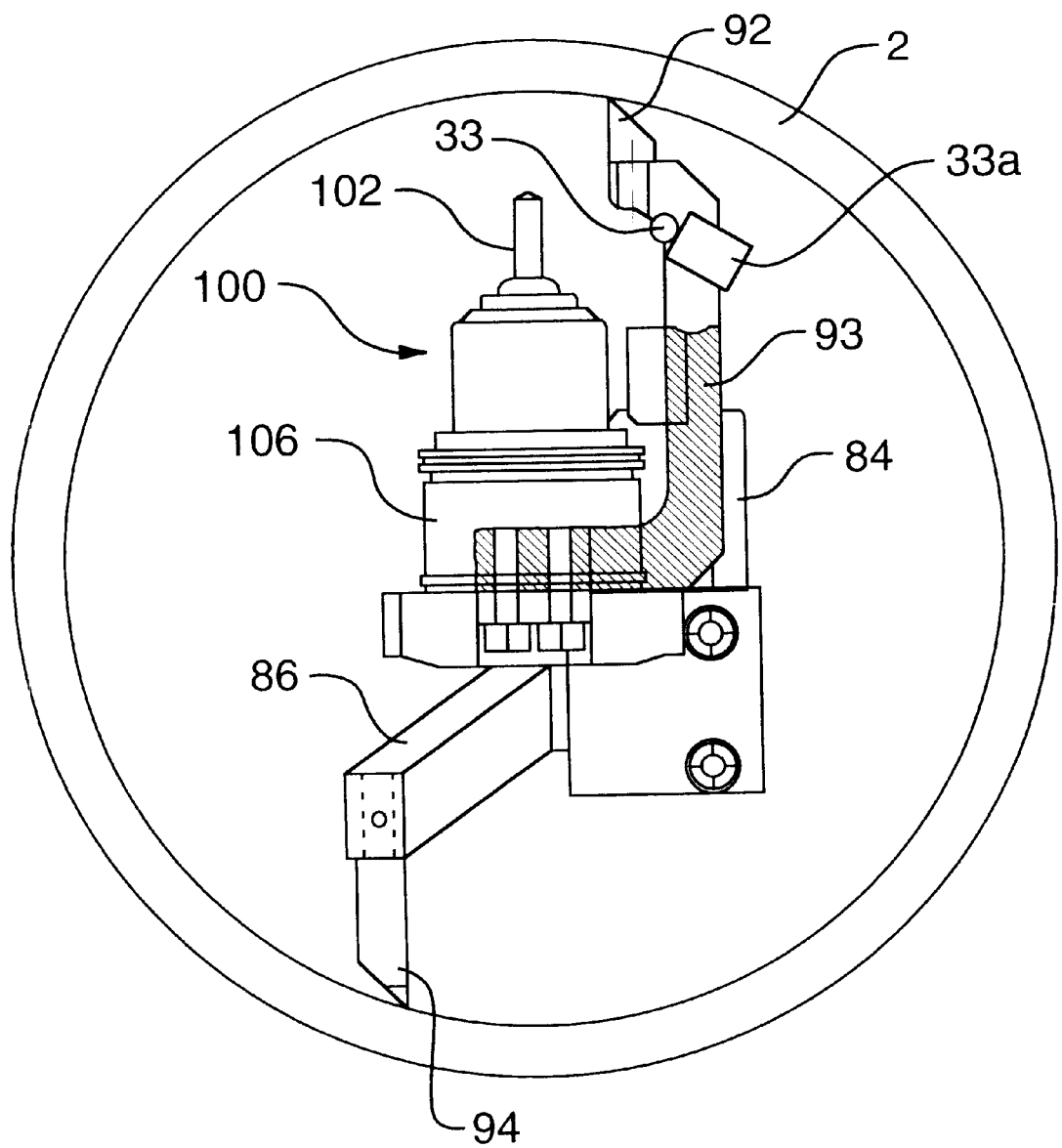
FIG. 9 is a front elevation of the drill assembly of FIG. 7.

The drill assembly 80, illustrated in FIGS. 7 to 9, preferably comprises a caliper-shaped clamp comprising upper and lower stabilizing arms 84, 86, which respectively mount onto pins 46a and 46b projecting laterally from the drill assembly mount 46. The drill assembly actuator comprises hydraulic cylinder 88 mounted between the arms 84, 86 to actuate movement between the open and closed positions. The cylinder 88 is preferably formed in or mounted on the lower arm 86, with its piston 89 pivotally connected to the upper arm 84 by a slotted shackle 82, as shown in FIG. 7. The arms 84, 86 are thus pivotable by the operator between the closed position shown in FIG. 1 and the open position shown in FIG. 2.

An outwardly projecting stabilizing pin 92 is provided adjacent to the end of the upper arm 84, and an outwardly projecting stabilizing pin 94 is provided adjacent to the end of the lower arm 86, so that when the arms 84, 86 are extended to the open position the pins 92, 94 bear against substantially diametrically opposite points of the inner wall of the pipe 2 to stabilize the drill assembly 80 within the pipe 2. In the closed position the arms 84, 86 occupy a radial area not substantially greater than the diameter of the body 20, and preferably smaller than the diameter of the body 20. This allows the device 10 to be inserted into a small opening in the pipe and to avoid accumulations of debris and corrosion as the device 10 is being fed along the pipe 2.

Figure 10:
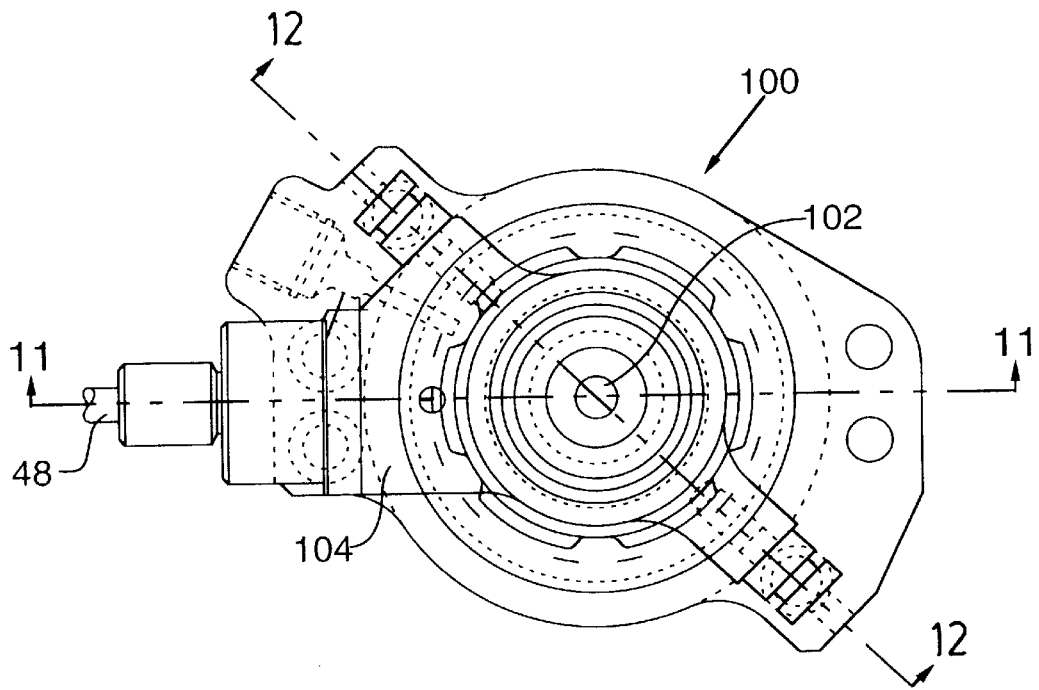
FIG. 10 is a top plan view of a preferred embodiment of the drill head.
Figure 11:
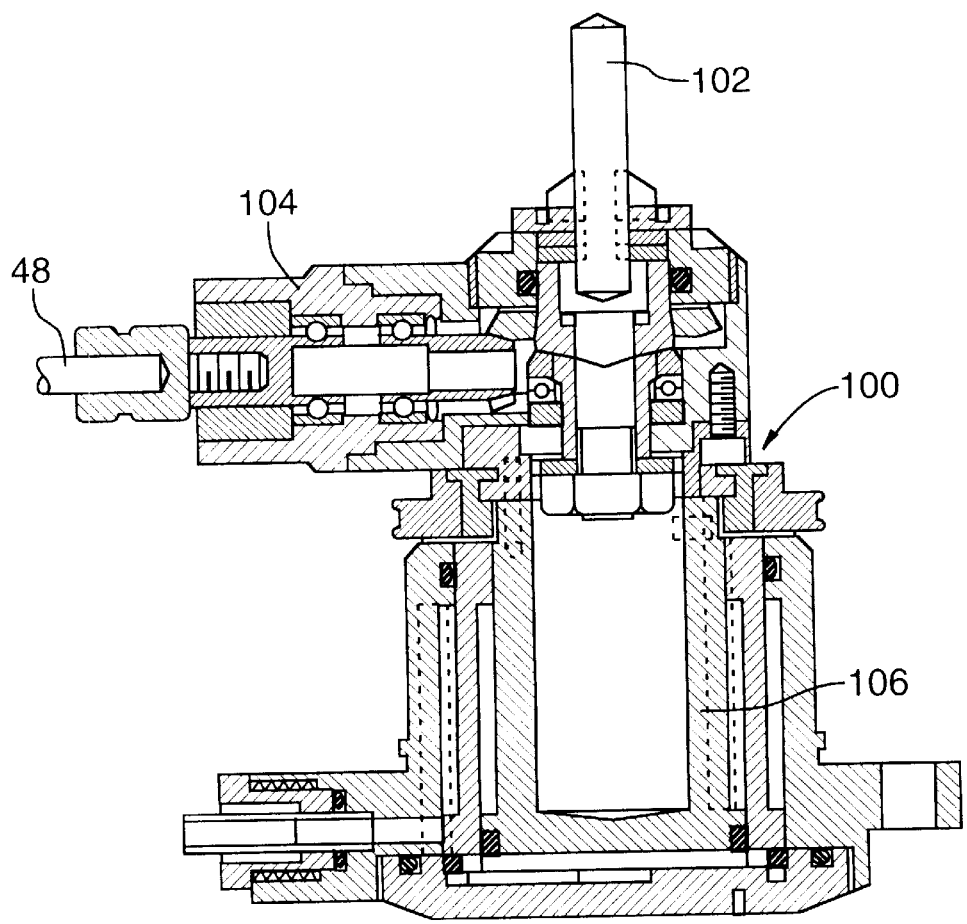
FIG. 11 is a cross-section of the drill head of FIG. 10 taken along the line 11—11.
Figure 12:
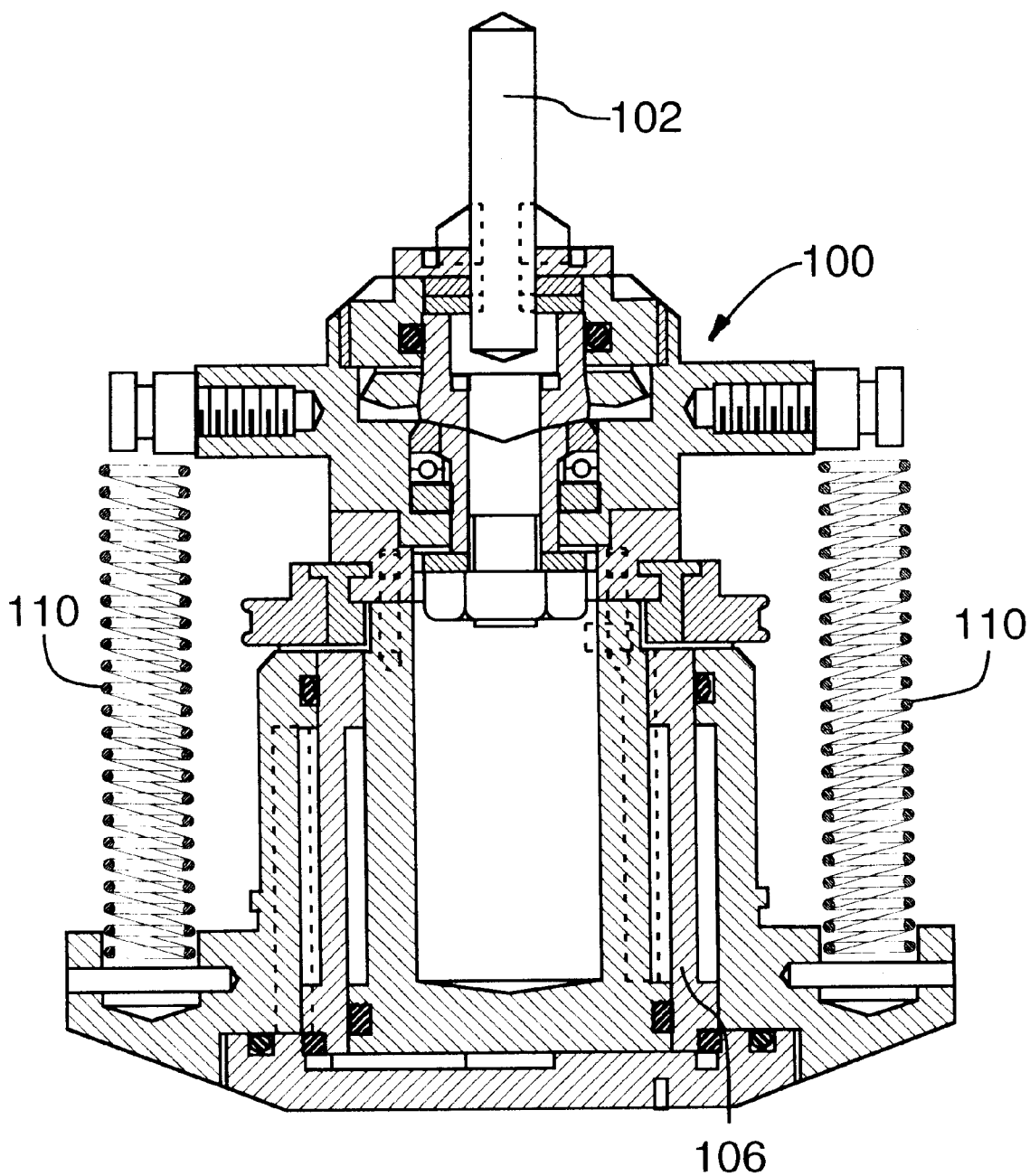
FIG. 12 is a cross-section of the drill head of FIG. 10 taken along the line 12—12.

The drill assembly 80 provides a rotating member for working a rotary tool against the pipe wall. In the preferred embodiment illustrated for repairing a pipe joint 4, the rotating member comprises a drill head 100 rotating a drill bit 102. The drill head 100, illustrated in FIGS. 10 to 12, is mounted on the upper arm 84 and preferably aligned substantially along the direction of motion of the upper arm 84. To obtain a uniform dispersion of sealant throughout the jute 5 in most applications requires that the sealant be injected near the top of the pipe joint 4, and thus the drill head 100 is preferably oriented so that the drill bit 102 is directed substantially vertically when the drill assembly 80 is in the neutral position.

The drill head 100 comprises a miniature right-angle gear box 104 driven by the flexible shaft 48, mounted on top of a drill actuator comprising a hydraulic cylinder 106 which, when actuated, urges the drill bit 102 against the pipe wall. In the embodiment shown the drill actuator comprises a two-stage telescoping hydraulic cylinder 106, but a single stage hydraulic cylinder may be used to provide the required urging force. Preferably the shaft 48 drives the bit 102 at a 3:1 speed reduction (torque multiplication), providing the drill bit 102 with the torque necessary to bore into cast iron and like hard materials. A pair of tension springs 110 provides a retractive force operating in conjunction with the hydraulic cylinder 106, to assist in retracting the drill bit 102 after drilling.

As shown in FIGS. 8 and 9, the upper stabilizing pin 92 is preferably supported on a brace 93 affixed to the upper arm 84 near the position of the drill head 100, on the side of the device 10 opposite to the camera 30. The upper pin 92 is thus offset from the vertical center of the body 20, allowing the camera 30 an unobstructed view of the drilling area. The block 33a supporting light pointers 33 may be conveniently mounted on the brace 93, as noted above directed toward the camera side of the device 10. The lower stabilizing pin 94 is offset commensurately toward the opposite side of the vertical center of the body 20. In this fashion the stabilizing pins 92, 94, although offset to opposite sides of the vertical center of the device 10, are in substantial diametric opposition relative to one another with the drill head 100 generally centered (horizontally) therebetween, as shown in FIG. 9.

Figure 13:
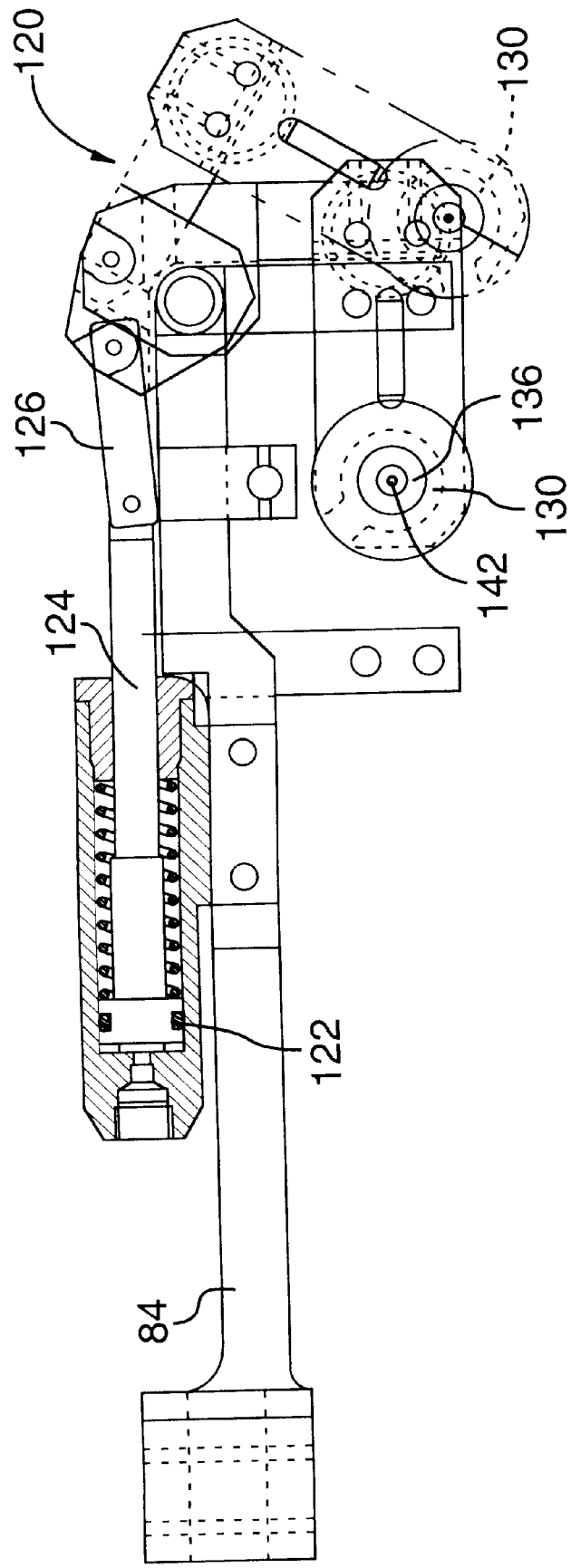
FIG. 13 is a top plan view of a preferred embodiment of a sealant nozzle mechanism for the device of FIG. 1.
Figure 14:
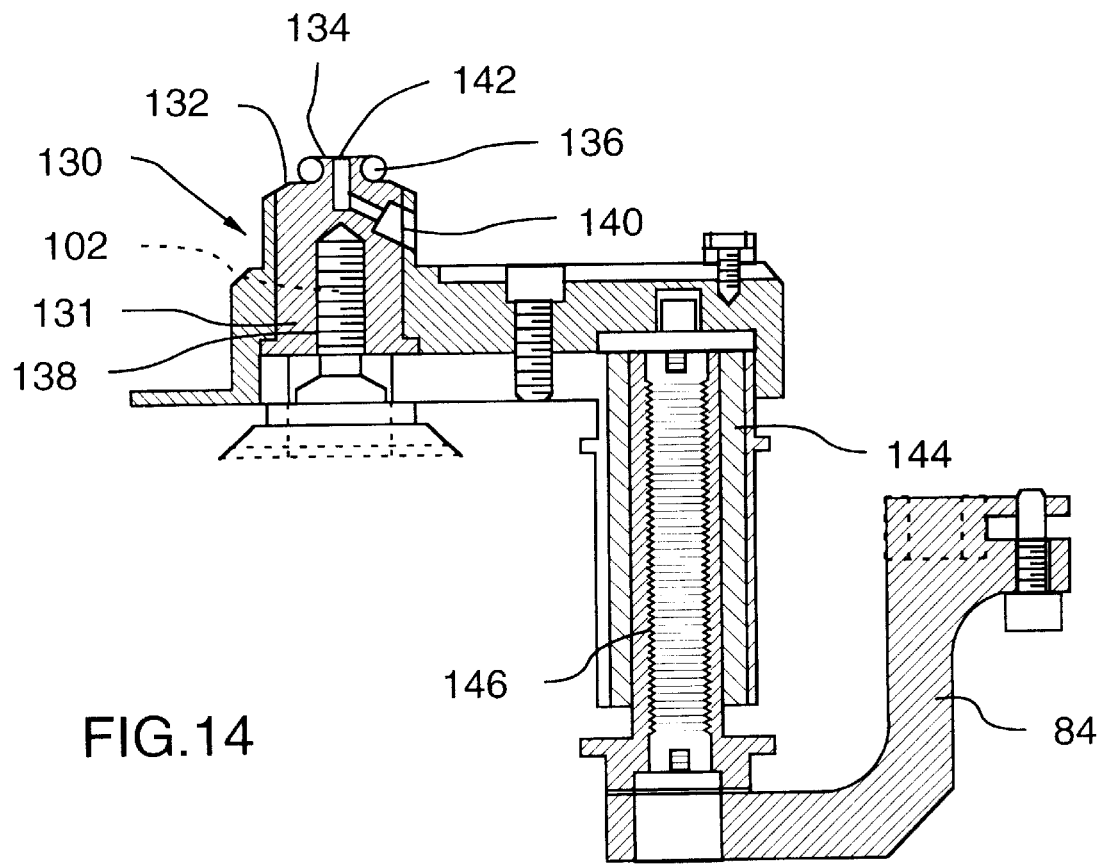
FIG. 14 is a cross section of a the sealant nozzle mechanism of FIG. 13.

In the preferred embodiment the drill assembly 80 includes a sealant nozzle mechanism 120, shown in FIGS. 13 and 14, mounted on the upper arm 84 adjacent to the drill head 100. The sealant nozzle mechanism 120 includes a sealant injection nozzle 130 comprising a cylindrical head 131 with a frustoconical bearing face 132 having a nipple 134 approximating the size of the drill bit 102 projecting above the bearing face 132 and surrounded by a gasket 136. A seating hole 138 bored in the head 131 is slightly larger than the drill bit 102, allowing the nozzle 130 to seat over the drill bit 102 after the hole has been drilled. Sealant enters the nozzle 130 through a sealant hose (not shown) coupled to an oblique bore 140 communicating with a sealant outlet port 142 centered in the nipple 134.

The sealant nozzle 130 is preferably affixed to or formed as part of a tubular arm 144 mounted pivotally and in telescoping relation over a support arm 146, which in turn is mounted on the upper arm 84 of the drill assembly 80. A shown in FIG. 13, the sealant nozzle mechanism 120 can thus pivot between a rest position adjacent to the drill head 100 (shown in phantom lines) and a sealing position directly in front of the drill head 100 (shown in solid lines). The lower limit of the sealant nozzle 130 is thus disposed slightly higher than the tip of the drill bit 102 when the drill head 100 is fully retracted, so that the nozzle 130 can clear the tip of the drill bit 102 to allow the sealant nozzle mechanism 120 to pivot between the rest position and the sealing position. A hydraulic cylinder 122 is mounted to the upper arm 84 with its piston 124 articulatively connected to the arm 144 through linkage 126, allowing the operator to control the position of the sealant nozzle mechanism 120. In the sealing position the sealant nozzle 130 is thus urged into position against the drilled hole by the drill actuator 106.

Figure 16:
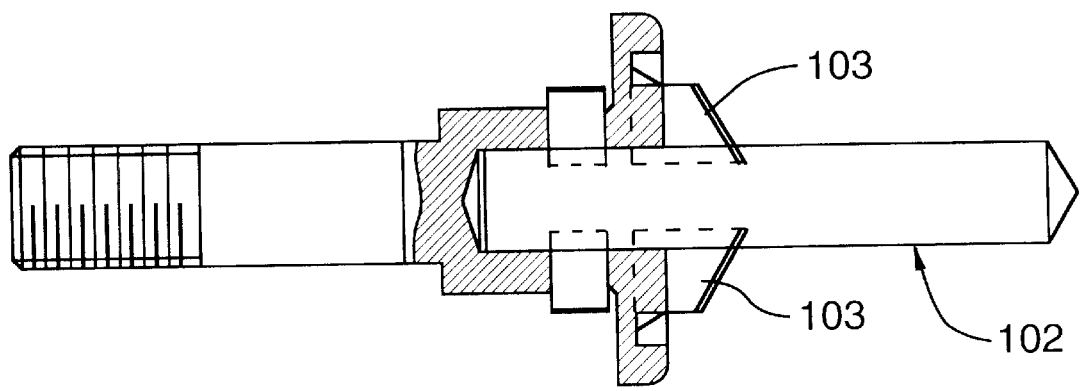
FIG. 16 is an enlarged side elevation of a preferred drill bit for the drill assembly of FIG. 7.

To ensure an effective seal between the sealant nozzle 130 and the wall of the pipe 2, the drill bit 102 is preferably provided with a tool for smoothing a portion of the pipe wall against which the sealant nozzle 130 will be pressed when the nozzle 130 is raised to bear against the pipe wall. As shown in FIG. 16, the base of the drill bit 102 is provided with a pair of blades 103 which contact the pipe wall as the drill bit 102 breaks through the spigot, to cut or grind corrosion and debris away from the interior surface of the pipe wall and provide a smooth seat for the sealant nozzle 130 during the sealing operation. Preferably the blades 103 are configured to conform to the shape of the bearing face 132 of the sealant nozzle 130 and the gasket 136, and slightly countersinks the pipe wall correspondingly.

Figure 15:
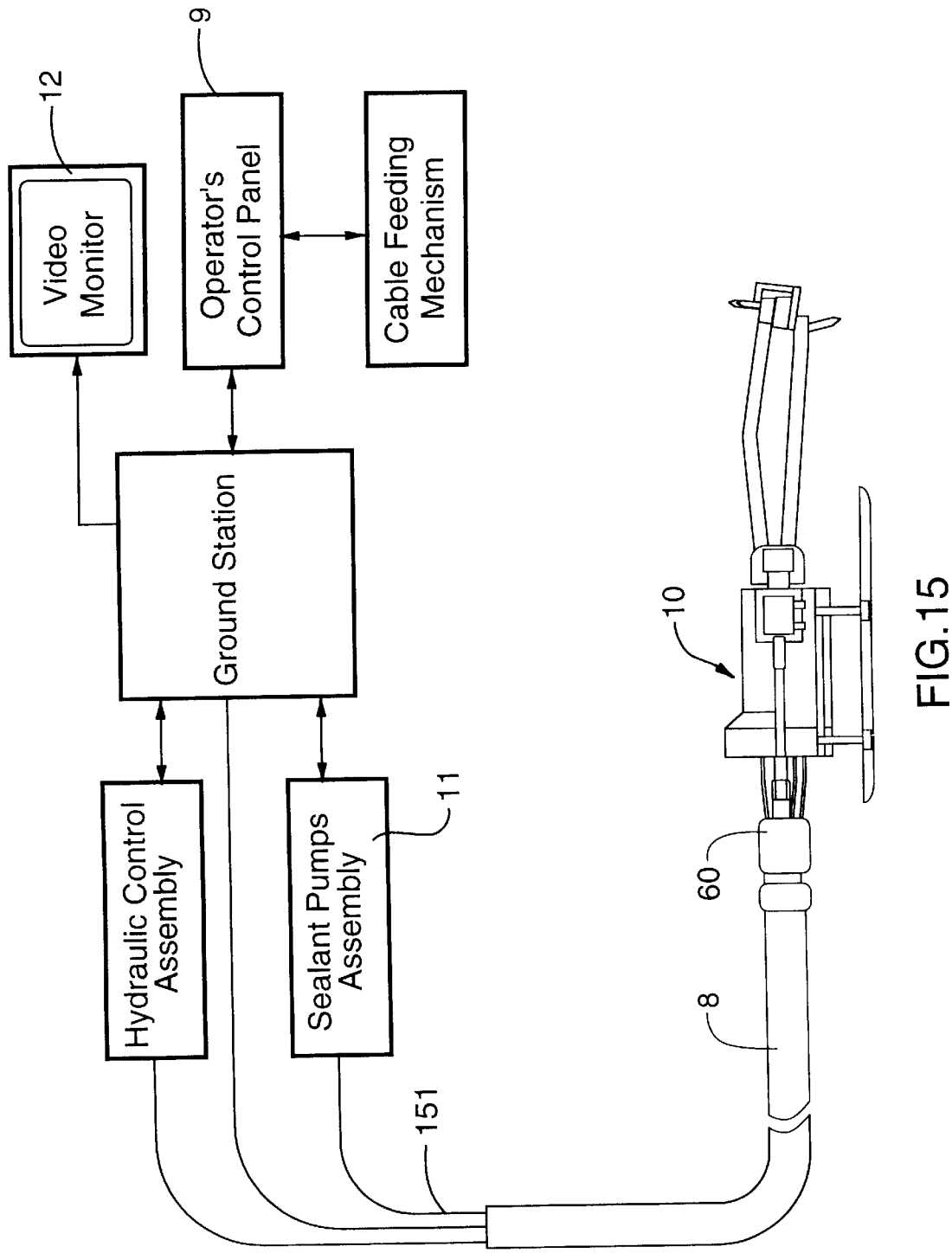
FIG. 15 is a schematic view of a control system for the device of the invention.

A preferred embodiment of the control system for the device 10 is illustrated schematically in FIG. 15. The control system for the device 10 is a modified version of the control system described in U.S. Pat. No. 5,527,169 issued Jun. 18, 1996, which is incorporated herein by reference.

The device 10 uses a conventional anaerobic sealant of the type commonly used to seal pipe joints 4 in natural gas mains. When using such a sealant the sealant delivery system must be flushed regularly (eg. daily) in order to avoid constriction or blockage by accumulated sealant. Small branching chambers and conduits, and constrictions in the sealant hose 151, should therefore be avoided as they tend to be difficult to flush out thoroughly. In the preferred embodiment sealant is pumped by sealant pump 11, which is preferably a peristaltic pump operating on the exterior of the sealant hose 151, controlled by a multi-position rotary switch allowing sealant to be injected at any desired pressure (preferably in the range between 10 and 90 PSI controlled in 10 PSI increments). The sealant is pumped from a conventional sealant reservoir 11a located at the operator's station 9 through a plastic hose of consistent diameter running through the umbilical cable 8 and coupled to the sealant nozzle 130. In order to maintain pressure at the desired level, and to assist in determining whether the drilling operation was unsuccessful in penetrating through to the jute or the jute 5 has become saturated (in either case the pressure in the sealant system rises abruptly), a pressure sensor 150 is provided which communicates with a pump controller to increase or decrease the speed of the pump motor.

Figure 17:
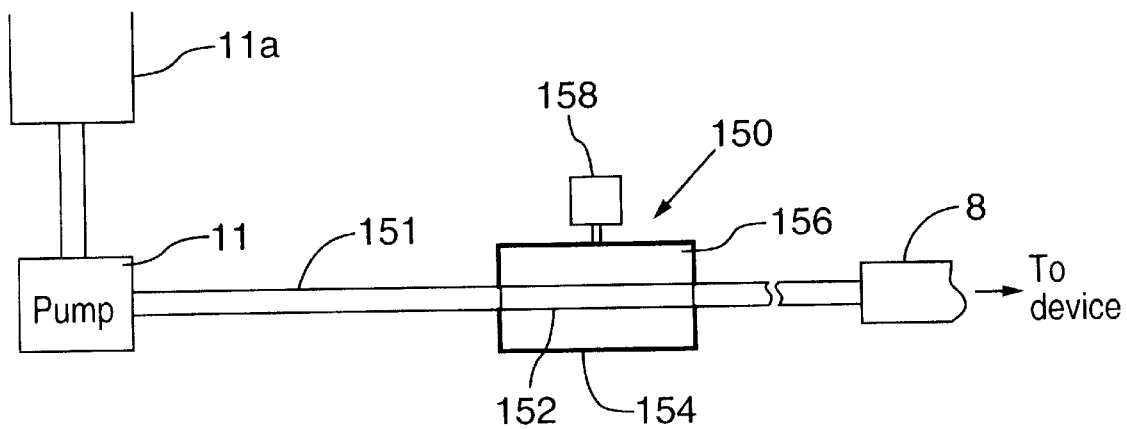
FIG. 17 is a schematic view of a preferred embodiment of a sealant injection system for the invention.

In order to avoid accumulation of sealant within the pressure sensor 150, an external pressure sensing system is used. As illustrated in FIG. 17, the sealant pressure sensor 150 comprises a flexible inner hose 152, for example composed of silicone, in fluid communication with the sealant hose 151 at each end. The hose 152 is encased in a housing 154 which is filled with a fluid 156 preferably under sufficient pressure to compress the hose 152 slightly when the sealant delivery system is at ambient pressure. A conventional pressure sensing device 158 is disposed in fluid communication with the housing 154, so that as the pressure within the sealant hose 151 (and thus within the hose 152) rises fluid 156 is forced into the pressure sensor 158, the pressure of the fluid 156 increasing in proportion to the increase in the pressure of the sealant within the hose 152. The pressure sensor 158 thus monitors the pressure in the sealant hose 151 and controls the speed of the sealant pump 11 to maintain a constant pressure in the sealant delivery system.

Optionally two separate, substantially identical sealant delivery systems converging immediately upstream of the sealant nozzle 130 may be provided. This allows the operator to select between sealants of differing viscosity, as may be appropriate for any particular application of the device 10, and also provides a backup sealant delivery system in case one of the sealant delivery systems becomes blocked or otherwise fails.

The operation of the device 10 will be described in the context of the repair of a pipe joint 4. The umbilical cable 8 is attached to the device 10 by connecting the hydraulic and sealant hoses and electrical wires projecting from the adaptor 60 to the designated couplings 25 and through designated openings in the back plate 24 of the device 10. The video camera 30, which preferably always remains attached to the umbilical cable 8, is mounted into the recess 28.

If necessary the operator sets the arms 84, 86 to the closed position illustrated in FIG. 1 and retracts the runners 50 into the grooves 23. The operator then inserts the device 10 into a pipe 2 through an existing opening or through an opening drilled for this purpose, preferably using a launching mechanism such as that described and illustrated in U.S. Pat. No. 5,681,131, which is incorporated herein by reference. The operator activates the video camera 30 and lights 31 and, watching the monitor 12, feeds the device 10 along the inside of the pipe 2 by manual or mechanical feeding of the umbilical cable 8, for example as described in U.S. Pat. No. 5,681,131, however any suitable manual or mechanical means for feeding the device 10 through a pipe 2 may be employed and the invention is not intended to be limited in this respect.

The umbilical cable 8 is fed carefully to try to maintain the device 10 substantially upright as it progresses along the pipe 2. Some twisting or stressing of the umbilical cable 8 may occur which causes the device 10 to stray from the vertical orientation, in which case the operator can right the device 10 by rotating the semi-rigid umbilical cable 8 in the appropriate direction.

When a pipe joint 4 is located by the abrupt disappearance of the light spot from one of the light pointers 33, the operator opens the arms 84, 86 until the stabilizing pins 92, 94 just touch the interior wall of the pipe 2. In this position the device can still be fed slowly along the pipe but remains properly centered and largely stable due to the slight contact between the stabilizing pins 92, 94 and the pipe wall. The operator feeds the device 10 to a position at which the drill head 100 is immediately beneath the spigot, which may for example be indicated by the point where the light spot from the leading light pointer 33 starts to reappear on the far side of the joint gap. The operator rotates the drill assembly 80 in the circumferential direction if necessary to select the appropriate drilling angle, which will generally be near the top of the spigot. Once the target angle has been selected the operator opens the arms 84, 86 at full pressure so that the pins 92, 94 bear against substantially opposing points on the interior of the pipe wall, anchoring the device 10 in position for drilling.

The operator starts the drill motor 26, which rotates the drill bit 102 through flexible shaft 48 and gear box 104. The operator actuates the drill actuator 106, forcing the drill bit 102 against and into the pipe wall, penetrating the spigot 4. The length of the drill bit 102 is selected to ensure that only the spigot is drilled and penetration into the bell is avoided. As the drill bit 102 reaches maximum penetration the blades 103 contact the interior wall of the pipe 2 and cut a shallow, smooth seat for the sealant nozzle 130.

When the jute 5 has been penetrated the operator fully retracts drill actuator 106 and deactivates the drill motor 26. The operator then pivots the sealant nozzle mechanism 120 into the sealing position, with the sealant nozzle 130 disposed in front of the drill bit 102, as shown in solid lines FIG. 13. The operator again extends the drill actuator 106, and when the drill bit 102 is fully seated in the seating hole 138 the arm 144 begins to extend until the bearing face 132 of the sealant nozzle 130 and the gasket 136 contact the seat cut into the pipe wall by the blades 103, the nipple 134 projecting into the drill hole in the spigot 4 and the gasket 136 providing a substantially fluid-tight seal. The operator then activates the sealant injection pump 11 to inject sealant into the jute 5.

As the operator starts the sealant injection pump 11 the pressure within the sealant delivery system begins to rise and sealant is pumped from the sealant reservoir through the sealant nozzle 130 into the jute 5. The pressure sensor 158 maintains a consistent pressure, preferably around 40 PSI, within the sealant hose. When the jute 5 becomes saturated (as indicated by the volume of sealant injected and/or pooling of sealant within the pipe 2) the operator reverses the sealant pump 11 to relieve the pressure within the sealant hose and retracts and the drill actuator 106 until the drill bit 102 unseats from the seating hole 138. (If the pressure rises too rapidly before any significant amount of sealant has been injected the operator may decide that the drilling operation did not successfully penetrate into the jute, and may withdraw the sealant injection mechanism 130 and rotate the drill assembly 80 a few degrees to drill a new hole.)

The operator pivots the sealant nozzle mechanism 120 back to the rest position shown in phantom lines in FIG. 13. The operator closes the arms 84, 86 enough to retract the stabilizing pins 92, 94 from the pipe wall, and the device 10 can be fed further down the pipe 2 for additional repairs. In this fashion the operator can repair multiple pipe joints 4 in the same pipeline, stopping to perform the repair operation as described above at each successive pipe joint 4. When the repair operation is complete, the umbilical cable can be wound onto a reel (not shown), such as that described and illustrated in U.S. Pat. No. 5,681,131, and the device 10 is thus drawn out of the pipe 2. As the device 10 nears the access opening the runners 50 are retracted into the grooves 23 in the housing 22, and the device 10 is withdrawn through the access opening, cleaned off and stored for future use.

A preferred embodiment of the invention having been thus described by way of example only, it will be apparent to those skilled in the art that certain modifications and adaptations may be made without departing from the scope of the invention, as set out in the appended claims. For example, it will be appreciated that the device 10 of the invention can be fitted with rotary tools other than a drill bit 102, for locating and effecting repairs inside the pipe 2 such as grinding, clearing debris and the like, and the description of the device 10 in the context of a device for repairing pipe joints 4 is illustrative of the operation of the device and not intended to be limiting.

We claim:

1. A device for repairing a pipe having a pipe wall, comprising a body and a drill assembly mounted on the body, the drill assembly comprising upper and lower arms, movable between a closed position in which the arms occupy a radial area not substantially greater than a diameter of the body, and an open position in which the arms bear against substantially opposing points of the pipe wall to stabilize the drill assembly within the pipe, a locating system for locating a portion of the pipe to be repaired, and a rotating member mounted on one of the arms for rotating a tool against the pipe wall, the rotating member being actuated independently of the arms to move the tool toward and away from the pipe wall while the drill assembly is stabilized by the arms, whereby when the arms are in the open position the drill assembly stabilizes the rotating member for rotating the tool against the pipe wall.

2. The device of claim 1 in which the rotating member is a drill head and the tool is a drill bit.

3. The device of claim 2 in which the drill head comprises a telescoping drill actuator for urging the drill bit against the pipe wall.

4. The device of claim 1 in which the upper arm is pivotally mounted on a drill assembly mount projecting from the body.

5. The device of claim 4 in which the lower arm is pivotally mounted on a drill assembly mount projecting from the body.

6. The device of claim 5 in which the drill assembly is pivotable between the open and closed positions by a hydraulic actuator mounted between the upper arm and the lower arm.

7. The device of claim 1 in which the drill bit is rotated by a flexible shaft actuated by a motor contained within the body.

8. The device of claim 7 in which the drill bit is rotated by a gear mechanism coupled to the flexible shaft to increase the torque on the drill bit.

9. The device of claim 7 in which a sealant injection nozzle is mounted on the upper arm.

10. The device of claim 9 in which the sealant injection nozzle is pivotally mounted and adapted to pivot between a rest position adjacent to the drill head and a sealing position in which sealant injection nozzle is disposed in front of the drill head.

11. The device of claim 10 in which a lower end of the sealant injection nozzle is provided with a seating bore adapted to receive the drill bit, and the drill actuator raises the sealant injection mechanism causing the sealant injection nozzle to bear against the pipe wall in the sealing position.

12. The device of claim 11 in which a base of the drill bit comprises a tool for smoothing a portion of the pipe wall against which the sealant nozzle is pressed when the nozzle is raised to bear against the pipe wall.

13. The device of claim 12 in which the drill actuator comprises a multi-stage telescoping hydraulic cylinder.

14. The device of claim 1 in which the upper arm and lower arm are each provided with a stabilizing pin which contacts the pipe wall when the drill assembly is in the open position.

15. The device of claim 1 in which the body is provided with runners for gliding along the pipe wall.

16. The device of claim 15 in which a pair of runners are spaced about a vertical center of the body.

17. The device of claim 16 in which the runners are retractable into grooves formed in the body.

18. The device of claim 1 in which the drill assembly is rotatable about an axis of the device.

19. The device of claim 1 in which the drill assembly is mounted on a hollow shank through which a shaft for rotating the rotatable member is disposed.

20. The device of claim 1 in which the locating system comprises a video camera mounted on the device and a video monitor remote from the device.

21. A device for repairing a pipe joint, comprising a body, a drill assembly mounted on the body, the drill assembly comprising upper and lower arms, movable between a closed position in which the arms occupy a radial area not substantially greater than a diameter of the body and an open position in which the arms bear against substantially opposing points of a wall of the pipe to stabilize the drill assembly within the pipe, a drill head mounted on one of the arms for urging a drill against the pipe wall to produce a drill hole, a locating system for locating a portion of the pipe to be repaired, a remotely operated control panel for controlling the device, and a sealant injection nozzle mounted on the upper arm for injecting a sealant into the pipe joint through the drill hole, wherein when the arms are in the open position the drill assembly stabilizes the drill head and the drill head can be actuated independently of the arms to move the drill toward and away from the pipe wall.

22. The device of claim 21 in which the drill head comprises a telescoping drill actuator for urging the drill bit against the pipe wall.

23. The device of claim 21 in which the upper arm is pivotally mounted on a drill assembly mount projecting from the body.

24. The device of claim 22 in which the lower arm is pivotally mounted on a drill assembly mount projecting from the body.

25. The device of claim 23 in which the drill assembly is pivotable between the open and closed positions by a hydraulic actuator mounted between the upper arm and the lower arm.

26. The device of claim 21 in which the drill head is rotated by a flexible shaft actuated by a motor contained within the body.

27. The device of claim 26 in which the drill head is rotated by a gear mechanism coupled to the flexible shaft to increase the torque on the drill bit.

28. The device of claim 21 in which the sealant injection nozzle is pivotally mounted and adapted to pivot between a rest position adjacent to the drill head and a sealing position in which the nozzle is disposed in front of the drill head.

29. The device of claim 28 in which a lower end of the sealant injection nozzle is provided with a seating bore adapted to receive the drill bit, and the drill actuator raises the sealant injection nozzle causing the sealant injection nozzle to bear against the pipe wall in the sealing position.

30. The device of claim 28 in which a base of the drill bit comprises a tool for smoothing a portion of the pipe wall against which the sealant nozzle is pressed when the nozzle is raised to bear against the pipe wall.

31. The device of claim 28 in which the drill actuator comprises a multistage telescoping hydraulic cylinder.

32. The device of claim 21 in which the upper arm and lower arm are each provided with a stabilizing pin which contacts the pipe wall when the drill assembly is in the open position.

33. The device of claim 21 in which the runners are retractable into grooves formed in the body.

34. The device of claim 21 the drill assembly is rotatable about an axis of the device.

35. The device of claim 34 in which the drill assembly is mounted on a hollow shank through which a shaft for rotating the drill is disposed.

36. A method of repairing a pipe joint inside a pipe, comprising the steps of:

(a) inserting into the pipe a device comprising a body having a drill assembly including an actuator and a sealant nozzle mechanism, (b) locating a pipe joint, (c) activating the actuator to urge a drill bit against the pipe and drilling a hole through the pipe, (d) retracting the drill bit from the hole, (e) moving the sealant nozzle mechanism in front of the actuator and activating the actuator to cause the sealant nozzle mechanism to bear against the hole, and (f) injecting sealant into the hole.

37. The method of claim 36 in which the drill head is rotated by a flexible shaft actuated by a motor contained within the body.

38. The method of claim 36 in which the sealant nozzle mechanism is pivotally mounted to the drill assembly and adapted to pivot between a rest position adjacent to the drill bit and a sealing position in which the nozzle is disposed in front of the drill bit.

39. The method of claim 36 in which a base of the drill bit comprises a tool for smoothing a portion of the pipe wall against which the sealant nozzle is pressed when the nozzle is raised to bear against the pipe wall.

40. The method of claim 36 including after step (b) the step of stabilizing the drill assembly within the pipe by opening a pair of opposed arms so that the arms bear against substantially opposing points of the pipe to anchor the drill assembly.

* * * * *